United States Patent
Raden

(10) Patent No.: US 6,231,050 B1
(45) Date of Patent: May 15, 2001

(54) GASKET WITH FORMABLE TABS AND METHOD

(75) Inventor: Edward A. Raden, Downers Grove, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/322,468

(22) Filed: May 28, 1999

(51) Int. Cl.$^7$ ................................. F02F 11/00; F02F 7/00
(52) U.S. Cl. .................... 277/598; 123/195 C; 29/88.3
(58) Field of Search ........................ 277/591, 598, 277/608, 609, 616, 630, 637; 123/195 C; 29/888.3, 513

(56) References Cited

U.S. PATENT DOCUMENTS

| | | | |
|---|---|---|---|
| 1,163,082 | * 12/1915 | Gold . | |
| 2,867,464 | 1/1959 | Crampton . | |
| 2,945,715 | 7/1960 | Burrell . | |
| 3,108,818 | * 10/1963 | Furstenburg . | |
| 3,261,086 | 7/1966 | Dunn . | |
| 3,302,221 | * 2/1967 | Zysman . | |
| 3,661,235 | * 5/1972 | Harrison . | |
| 4,380,301 | 4/1983 | Eisman . | |
| 4,394,853 | 7/1983 | Lopez-Crevillen et al. . | |
| 5,095,617 | * 3/1992 | Costa et al. . | |
| 5,141,247 | * 8/1992 | Barth . | |
| 5,333,884 | * 8/1994 | Miyaoh et al. . | |
| 5,340,126 | * 8/1994 | Antonini et al. . | |
| 5,340,170 | * 8/1994 | Shinohara et al. . | |
| 5,366,261 | * 11/1994 | Ohmi et al. . | |
| 5,529,313 | 6/1996 | Malks . | |
| 5,803,465 | 9/1998 | Schweiger . | |

* cited by examiner

Primary Examiner—Anthony Knight
Assistant Examiner—Vishal Patel
(74) Attorney, Agent, or Firm—Rader, Fishman & Grauer PLLC

(57) ABSTRACT

A gasket for sealing between a mating surface of a first mating component and a second mating component includes a sealing body defined by an inner and outer peripheral edges from which a plurality of integral formable inner and outer tabs extend therefrom. The inner tabs are deformed into an engagement position to assist in properly locating the gasket on the mating surface and to engage the first mating component to retain the gasket on the mating surface in proper alignment. Similarly, the outer tabs are deformed into an engagement position over an outer peripheral edge of the mating surface to retain the gasket on the mating surface in proper alignment.

24 Claims, 1 Drawing Sheet

GASKET WITH FORMABLE TABS AND METHOD

FIELD OF THE INVENTION

The present invention relates to a gasket with integral tab retainers. More particularly, the present invention relates to a gasket including a plurality of tabs formed on outer and inner peripheral edges of a layer of the gasket to locate and retain the gasket on a mating surface of a mating component.

BACKGROUND OF THE INVENTION

Gaskets are often used as a seal between mating metal surfaces. Common applications involve the placement of a gasket between a cylinder block and a fluid pan or a valve cover of an internal combustion engine. Such a gasket provides a seal that retains engine fluids vital for engine operation and prevents them from either escaping into the engine compartment of a vehicle or contaminating other vehicle components.

In an engine, gaskets are typically installed by placing a gasket between a cylinder block and a mating component and aligning bolt apertures formed in the gasket with corresponding apertures formed in the cylinder block and the mating component. Generally, a threaded fastener passes through the mating component and gasket and engages a corresponding threaded aperture formed in the cylinder block. Some maneuvering of the mating component and gasket relative to the cylinder block may be required to align the apertures therein with the corresponding threaded apertures of the cylinder block before fasteners can be inserted. However, during the assembly process, the gasket may slip from its desired position or drop off the end of the inserted fastener before it can be fixed in place.

Attempts have been made to retain a gasket against a mating component prior to and during assembly by providing separate clips for attaching the gasket to a mating component. Using such clips, a gasket is placed adjacent to the mating component, and the separate clip is attached to the mating component such that the gasket is secured in place between the clip and the mating component. The separate clips typically include one end for contacting the gasket about an outer periphery thereof while a second end is attached to an outer periphery of a mating component or to an outer periphery of a connecting portion between mating components. Use of such separate clips does not eliminate the problems involved in the assembly process whereby a gasket may slip from its desired position. The clip attached to an outer periphery of the mating component may be jostled or become otherwise dislodged by contacting adjacent parts and potentially falling into the fluid pan or engine bore causing later interference with engine operation. Further, separate clips may become dislodged during subassembly, handling, and shipping of mating components, allowing the gasket to slip or drop. As a result, the gasket may become offset or mis-aligned from the holes to be sealed before assembly, again requiring some realignment of the mating component and gasket to achieve a tight seal. Assembly of a gasket to the mating component using separate clips is also a complex operation, requiring multiple parts and means to hold the gasket adjacent the mating flange while the clips are attached.

Another attempt to retain a gasket against a mating component prior to and during assembly involves the use of an adhesive. The adhesive is applied to the gasket prior to its alignment with the apertures of a mating component. The use of adhesives has a number of disadvantages. For example, the gasket could become accidentally misaligned or displaced before the adhesive has set, making it difficult to return the gasket to its proper alignment. Moreover, adhesives may detrimentally impact the material load bearing properties of the gasket while in operation, thereby adversely effecting the seal integrity. Adhesives lower the ability of the gasket to carry high loads because the adhesive reduces surface friction between the gasket and the mating component generally cause the gasket to slip from its sealing position under the application of high loads placed on the gasket.

Another commonly used way to retain a gasket against its mating component prior to and during assembly employs fasteners installed through the bolt apertures of the mating component and the corresponding bolt apertures of the gasket. These fasteners must match the size and thread of the bolt apertures, requiring an array of fastener sizes to accommodate differently sized apertures. Installation of the fasteners also complicates manufacturing by first requiring installation of the fasteners as a prerequisite assembly step followed by fastener removal prior to insertion of the actual bolts. More importantly, the fasteners increase the assembly process complexity. The fasteners, although retaining the position of the gasket on the mating component, often interfere with the maneuverability of the mating component and gasket when brought into alignment for installation to a component such as a cylinder block.

SUMMARY OF THE INVENTION

The present invention is directed to a gasket formed with integral formable inner and outer tabs used to locate and retain the gasket on a mating surface of a first mating component such as a fluid pan or a valve cover of an engine.

The gasket of the present invention includes layer that forms a sealing body. An inner peripheral edge and an outer peripheral edge define the main sealing body of the gasket. A plurality of inner formable tabs extend radially from the inner peripheral edge and a plurality of outer formable tabs extend radially from the outer peripheral edge. The inner and outer tabs are integrally formed with the sealing body to simplify manufacture, thereby permitting the tabs and sealing body to be formed or stamped from the same piece of material and eliminating the need for additional clips or fasteners to retain the gasket in position during assembly.

The tabs are deformable into an engaged position through frictional contact with the first mating component and easily manipulatable by hand or through the use of simple shaping tools. The inner and outer tabs are uniformly spaced around the inner and outer peripheral edges of the sealing body to secure all sides of the sealing body to the first mating component to avoid shift or slippage of the gasket from its proper alignment. At least one inner tab and outer tab is placed on each distinguishable side of the sealing body to avoid slippage or shift of the gasket from all directions and to simplify relocating the gasket into proper alignment on the mating surface should dislodgment occur by providing multiple reference points to accurately relocate the gasket back onto the mating surface. Preferably, each inner tab extending radially from the inner peripheral edge of the sealing body corresponds with an outer tab extending radially from the outer peripheral edge of the sealing body in an orientation in which the inner and outer tabs are opposite each other to more evenly distribute retention forces applied by the deformed tabs across the sealing body when engaged with the first mating component.

During installation, the sealing body is placed on a mating surface of a first mating component, such as a flange, to align bolt apertures in the sealing body with the bolt aperture in the mating surface. After the apertures are properly aligned to permit a bolt to extend through both apertures without interference, the inner tabs extending radially from the inner peripheral edge are bent downwardly from the sealing body inwardly towards an interior wall of the first mating component. When bent, the inner tabs are deformed into an engaged position to be generally perpendicular relative to the sealing body and adjacent to the interior wall of the first mating component. The bent inner tabs engage the interior wall of the first mating component to avoid slippage of the gasket from proper alignment with the first mating component. Moreover, should the gasket separate from the mating surface during the assembly process, the bent inner tabs increase the ease of re-locating the gasket on the mating surface by providing an outline of orientation of the gasket relative to the mating surface to properly re-align the gasket on the first mating component.

The inner tabs also aid in the retention of the gasket to the mating surface ensuring proper alignment of the bolt apertures of the sealing body and the mating surface, which may become misaligned during assembly from movement and tipping of the first mating component or obstructions caused by other engine components that snag the gasket. Following the bending of the inner tabs generally perpendicular to the sealing body, the gasket is removed from the mating surface. Each bent inner tab is then slightly further bent inwardly in the direction of the interior wall of the first mating component as if the sealing body was still adjacent to the mating surface. The inner tabs are bent further inwardly to permit each tab to frictionally engage the interior wall of the first mating component when the gasket is relocated on the mating surface. The bent inner tabs provide a spring-biased engagement against the interior wall of the first mating component to enhance retention of the gasket on the first mating component and to prevent slippage of the gasket from proper alignment during the installation of the gasket and the first mating component to a second mating component such as other engine components like a cylinder block.

Further retention of the gasket in proper alignment is accomplished through the outer tabs extending radially from the outer peripheral edge of the sealing body. When the mating surface of the first mating component is a flange, the outer tabs are bent over an outer peripheral edge of the flange and around a lip in the flange's outer peripheral edge to frictionally engage the flange, effectively retaining the gasket in place against the mating surface.

Because the inner and outer tabs are integral with the sealing body, installation of the gasket is simplified because the gasket is retained on the mating surface of the first mating component without the need to use separate retaining parts like clips or fasteners typically used to positively retain the gasket adjacent a mating surface. The gasket according to the present invention also permits simplified removal from the mating surface without risk of damaging the gasket as well as avoiding reduced seal integrity when high loads are placed on the gasket, which commonly occurs if an adhesive is applied to retain the gasket on the mating surface. Moreover, the gasket can be removed by unbending the outer tabs to disengage their contact with the outer peripheral edge of the mating surface or flange. Thereupon, the gasket is reusable and can then be re-attached to the mating surface by re-bending the outer tabs over the flange's outer peripheral edge.

BRIEF DESCRIPTIONS OF THE DRAWINGS

The features and inventive aspects of the present invention will become more apparent upon reading the following detailed description, claims, and drawings, of which the following is a brief description:

FIG. 1 is a perspective view showing a gasket and a first mating component with a mating surface according to the present invention.

FIG. 2 a is cross-sectional view showing a gasket with formable inner and outer tabs, according to lines 2—2 of FIG. 1, prior to attachment to the mating surface of the first mating component.

DETAILED DESCRIPTION OF PREFERRED EMBODIMENT

Figure 1:
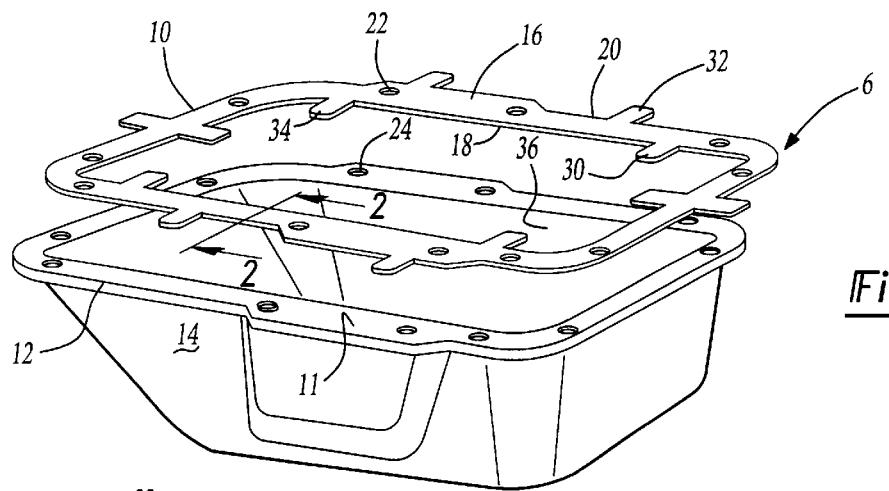

FIG. 1 shows a sealing assembly 6 that includes a gasket 10 to be installed adjacent a mating surface 11 on a first mating component 14, such as a fluid pan or a valve cover. For the purpose of illustration, mating component 14 is represented in FIG. 1 as a fluid pan and mating surface 11 is represented, in part, as flange 12. The gasket 10 includes a sealing body 16 defined by an inner peripheral edge 18 and outer peripheral edge 20. The sealing body 16 contains at least one bolt aperture 22 between the inner and outer peripheral edges 18, 20. Mating surface 11 contains at least one bolt aperture 24. Each aperture 22 in sealing body 16 and each aperture 24 in mating surface 11 correspond and align with each other when sealing body 16 is properly placed on mating surface 11 to permit a bolt to pass through the aligned apertures to form sealing assembly 6 when secured to a second mating component (not shown) such as an engine cylinder block.

The sealing body 16 of gasket 10 is typically formed from a composite of materials and may include multiple layers. Typically, the layers are made from cork-rubber bonded to a resilient central steel core, fiber reinforced paper mechanically or chemically bonded to a resilient central steel core, embossed steel pieces mated to a resilient steel core, or rubber molded around a resilient central steel core. However, it is understood that sealing body 16 can be composed of other materials and composite materials known in the art. The layers constituting sealing body 16 are preferably sized and shaped to fit and seal the corresponding mating surface 11. The outermost (i.e. top and bottom) layers (not shown) of the sealing body 16 may further include embossments, folds or any other surface feature designed to improve fit, wear and sealing ability of the gasket.

Figure 2:
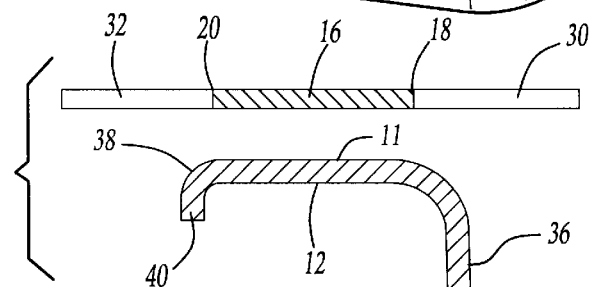

According to the present invention, at least one layer of the sealing body 16 includes a plurality of inner formable tabs 30 extending radially from inner peripheral edge 18. Once the sealing body 16 is properly aligned with mating component 14 to permit a bolt to extend through apertures 22, 24 without interference, inner tabs 30 are bent downwardly from sealing body 16 inwardly towards an interior wall 36 of the first mating component. When bent, tabs 30 are deformed into an engagement position to be generally perpendicular relative to sealing body 16 and adjacent to an interior wall 36 of the first mating component 14. The bent inner tabs 30 outline the shape of mating surface 11, thereby outlining an orientation of gasket 10 on first mating component 14 when apertures 22, 24 are properly aligned to assist in relocating gasket 10 on mating surface 11 should gasket 10 be separated or dislodged during the assembly process. Inner tabs 30 also retain gasket 10 on first mating component 14 ensuring proper alignment of apertures 22, 24, which typically become misaligned during installation of the sealing assembly 6 from movement and tipping of the first mating component or obstructions caused by other engine components that snag gasket 10. Inner tabs 30 are bent slightly further inwardly from perpendicular in the direction of the interior wall 36 of first mating component 14 to frictionally engage interior wall 36 of the first mating component 14 at an angle greater than 90° from their preformed state 42 as shown in FIG. 2. The frictional engagement of inner tabs 30 with interior wall 36 creates a spring biased engagement providing a load effect against interior wall 36 to retain gasket 10 in proper alignment and avoid misalignment that would otherwise result because of slippage or shift of gasket 10 while installing gasket 10 and first mating component 14 to a second mating component. Length of inner tabs 30 can be adjusted to provide the necessary spring biased engagement to retain proper alignment of gasket 10 on first mating component 14. Further, inner tabs 30 maybe bent along the length of inner tabs 30 away from its point of integration with scaling body 16 to increase the angle at which inner tabs 30 engage interior wall 36 to enhance the effect of the spring biased engagement applied by inner tabs 30 against interior wall 36 to provide greater retention and alignment forces for maintaining proper alignment of gasket 10 relative to first mating component 14.

The present invention also provides at least one layer of the sealing body 16 that includes a plurality of outer formable tabs 32 extending radially from the outer peripheral edge 20. Once gasket 10 is positioned on mating surface 11 containing flange 12, whereby aperture 22 aligns with aperture 24, outer tabs 32 extending radially from the outer peripheral edge 20 are bent over an outer peripheral edge 38 of flange 12. A lip 40 forms the outer peripheral edge 38 permitting outer tabs 32 to be bent over the outer peripheral edge 38 and around lip 40 deforming tabs 32 to frictionally engage outer peripheral edge 38, effectively locking gasket 10 adjacent against flange 12. It should be noted that outer tabs 32 are long enough to extend around lip 40 to firmly lock sealing body 16 to flange 12. The deformed outer tabs 32 provide additional retention of gasket 10 to first mating component 14 to secure proper alignment of gasket 10 and first mating component 14 while installing gasket 10 and first mating component 14 to a second mating component.

The inner and outer tabs 30, 32 are preferably formed integrally with sealing body 16, but it is understood that tabs 30, 32 could be formed separately from sealing body 16 and mechanically attached to the sealing body by means commonly employed in the art. The integral tabs 30, 32 simplify manufacture of gasket 10 because sealing body 16 and tabs 30, 32 are formed or stamped from the same piece of material. Installation of sealing assembly 6 is also simplified because integral tabs 30, 32 eliminate the need for separate parts to attach gasket 10 to mating surface 11 during the assembly process. Tabs 30, 32 deform into an engaged position with first mating component 14 that is manipulatable by hand or by simple shaping tools like pliers. Tabs 30, 32 may be formed into any geometric shape that is convenient to manufacture. Most preferably, the tabs 30, 32 are rectangular in shape and with a tip 34 formed with rounded corners at their distal end, which simplifies the manufacturing and tooling of the gasket. The rounded corners of tip 34 also eliminate the potential for damage to the interior wall 36 of the first mating component 14 during mating of gasket 10 to the first mating component if a pointed tip configuration was used, while retaining sufficient surface area at the distal end of the tip 34 to frictionally engage the interior wall 36 of the first mating component 14.

Inner tabs 30 and outer tabs 32 can be arranged in any configuration extending from the inner peripheral edge 18 and outer peripheral edge 20, respectively. Preferably, the inner tabs 30 and outer tabs 32 are uniformly spaced around the inner peripheral edge 18 and outer peripheral edge 20 to provide a more uniform hold of sealing body 16 on first mating component 14 from all sides of gasket 10 to avoid shift or slippage of the gasket from its proper alignment. At least one inner tab 30 and outer tab 32 should be placed on each distinguishable side of sealing body 16 to avoid slippage or shift of gasket 10 from all directions and to simplify relocating gasket 10 into proper alignment on mating surface 11 should dislodgment occur by providing multiple reference points to accurately relocate gasket 10 back onto mating surface 11. For example, FIG. 1 shows a sealing body rectangular in shape with four distinguishable sides, each distinguishable side represented by one side of the rectangle. Although the number of inner tabs 30 need not correspond with the number of outer tabs 32, preferably, each inner tab 30 extending radially from the inner peripheral edge 18 corresponds with an outer tab 32 extending radially from the outer peripheral edge 20 in an orientation in which the tabs are directly opposite each other across sealing body 16 to more evenly distribute retention forces applied by the deformed tabs 30, 32 across sealing body 16 when engaged with first mating component 14.

Figure 3:
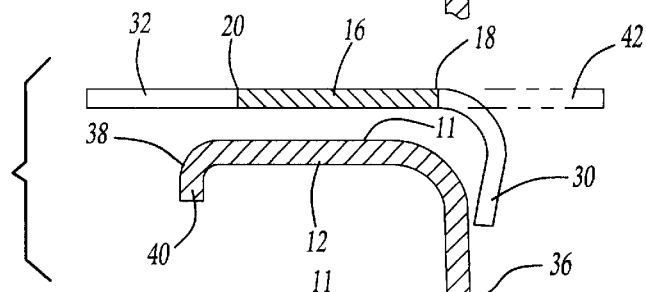
FIG. 3 is a cross-sectional view showing a gasket with formable inner and outer tabs, according to lines 2—2 of FIG. 1, illustrating the deforming of the inner tabs.

FIGS. 2–5 illustrate a preferred method of employing inner formable tabs 30 and outer formable tabs 32. To install the sealing assembly 6, the sealing body 16 is placed on the mating surface 11 to align the bolt aperture 22 of the sealing body with the bolt aperture 24 of the mating surface 11. Once aperture 22 and aperture 24 are properly aligned to permit a bolt to extend through both apertures without interference, inner tabs 30 extending radially from the inner peripheral edge 18 are bent downwardly from sealing body 16 inwardly towards an interior wall 36 of the first mating component. When bent, tabs 30 are deformed into an engagement position to be generally perpendicular relative to sealing body 16 and adjacent to an interior wall 36 of the first mating component as shown in FIG. 3. The bent inner tabs 30 outline the shape of the first mating component, thereby outlining an orientation of gasket 10 on mating component 14 when apertures 22, 24 are properly aligned to assist in relocating gasket 10 on mating surface 11 should gasket 10 be separated or dislodged during the assembly process.

Inner tabs 30 also aid in the retention of gasket 10 to mating surface 11 ensuring proper alignment of apertures 22, 24, which typically become misaligned during installation of the sealing assembly 6 from movement and tipping of the first mating component or obstructions caused by other engine components that snag gasket 10. Following the bending of inner tabs 30 generally perpendicular to sealing body 16, gasket 10 is removed from mating surface 11. Each bent inner tab 30 is then slightly further bent inwardly in the direction of the interior wall 36 of first mating component 14 as if sealing body 16 was still adjacent to mating surface 11.

Inner tabs 30 are bent further inwardly to permit each tab to frictionally engage the interior wall 36 of the first mating component to create a spring biased engagement to retain proper alignment of sealing body 16 when gasket 10 is relocated on first mating component 14. The spring biased engagement of bent inner tabs 30 thereby assists in retaining sealing body 16 on mating component 14 and orientating proper alignment of gasket 10 relative to first mating component 14 during installation of seal assembly 6.

Figure 4:
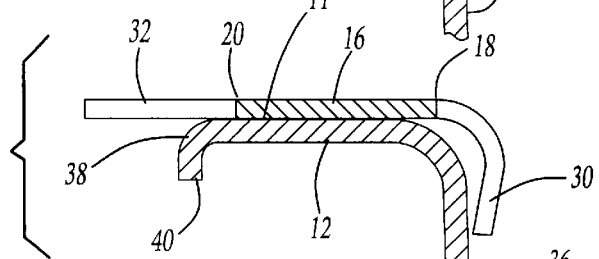
FIG. 4 is a cross-sectional view showing a gasket with formable inner and outer tabs, according to lines 2—2 of FIG. 1, after deforming the inner tabs and attachment of the gasket to a mating surface of the first mating component.
Figure 5:
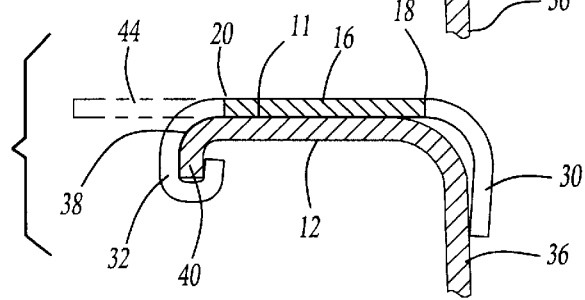
FIG. 5 is a cross-sectional view showing a gasket with formable inner and outer tabs, according to lines 2—2 of FIG. 1, after deforming the inner tabs and outer tabs and attachment of the gasket to a mating surface of a first mating component.

Once gasket 10 is positioned on mating surface 11 with aperture 22 aligned with aperture 24, outer tabs 32 extending radially form the outer peripheral edge 20 are bent over an outer peripheral edge 38 of flange 12. A lip 40 forms the outer peripheral edge 38 of flange 12 permitting outer tabs 32 to be bent over the outer peripheral edge 38 and around lip 40 deforming tabs 32 into an engagement position to frictionally engage outer peripheral edge 38, effectively retaining gasket 10 adjacent against mating surface 11. It should be noted that outer tabs 32 are long enough to extend around lip 40 to firmly lock sealing body 16 to mating surface 11. Gasket 10 can be removed from mating surface 11 without damaging gasket 10 by unbending outer tabs 32 to disengage their contact with the outer peripheral edge 38 of flange 12 and straightening outer tabs 32 to generally their preformed state 44 as shown in FIG. 4. Gasket 10 can then be re-attached to mating surface 11 by bending outer tabs 32 over the outer peripheral edge 38 of flange 12 as previously described.

Preferred embodiments of the present invention have been disclosed. The embodiments disclose a flange 12 serving as a mating surface 11 for gasket 10 because of outer tabs 32 extending from the outer peripheral edge 20 of gasket 10, which frictionally engage flange 12; however, the mating surface 11 need not be a flange if the outer tabs 32 are not employed in the invention. A person of ordinary skill in the art would realize, however, that certain other modifications would also come within the teachings of this invention. Therefore, the following claims should be studied to determine the true scope and content of the invention.

What is claimed is:

1. A gasket for sealing between a first mating component and a second mating component, the first mating component having a plurality of first apertures, comprising:
   a sealing body defined by an inner penpheral edge and an outer peripheral edge, with a plurality of second apertures in said sealing body between said inner and outer peripheral edges; and
   a plurality of tabs formed on one of said peripheral edges, said tabs bent downwardly from said sealing body towards an interior wall of the first mating component for locating and retaining said sealing body on the first mating component to align at least a subset of said second apertures of said sealing body and at least a subset of the first apertures of the first mating component.

2. A gasket as recited in claim 1, wherein said plurality of tabs are integral with said sealing body.

3. A gasket as recited in claim 1, wherein said plurality of tabs are bent downwardly from said sealing body towards said interior wall of the first mating component to frictionally engage said interior wall.

4. A gasket as recited in claim 1, wherein said plurality of tabs are uniformly spaced around said inner peripheral edge.

5. A gasket as recited in claim 1, wherein at least one of said plurality of tabs is placed on each distinguishable side of said sealing body.

6. A gasket as recited in claim 1, wherein said plurality of second apertures of said sealing body and said plurality of first apertures of the first mating component align.

7. A gasket as recited in claim 1, wherein said subset of said second apertures of said sealing body and said subset of the first apertures of the first mating component are adapted to receive fasteners.

8. A gasket as recited in claim 3, wherein said plurality of tabs are bent downwardly from said sealing body towards said interior wall of the first mating component at an angle greater than 90° from their preformed state.

9. A gasket as recited in claim 3, wherein said plurality of tabs are bent downwardly from said sealing body towards said interior wall of the first mating component to frictionally engage said interior wall to create a spring biased engagement by the tabs against said interior wall.

10. A gasket for sealing between a first mating component and a second mating component, the first mating component having a flange with at least one aperture, comprising:
    a sealing body defined by an inner peripheral edge and an outer peripheral edge, with at least one aperture in said sealing body between said inner and outer peripheral edges;
    a plurality of first tabs formed on said inner peripheral edge, said first tabs bent downwardly from said sealing body towards an interior wall of the first mating component for locating and retaining said sealing body on the flange to align the apertures of said sealing body and the flange; and
    a plurality of second tabs formed on said outer peripheral edge, said second tabs bent over an outer peripheral edge of the flange of the the first mating component to secure said sealing body to the flange.

11. A gasket as recited in claim 10, wherein said plurality of first tabs are bent downwardly from said sealing body inwardly towards said interior wall of the first mating component to frictionally engage said interior wall.

12. A gasket as recited in claim 10, wherein the plurality of first and second tabs are integral with said sealing body.

13. A gasket as recited in claim 10, wherein the plurality of first and second tabs extend from said sealing body in an orientation opposite each other.

14. A gasket as recited in claim 10 wherein said plurality of second tabs are bent around a lip connected to said outer peripheral edge of the flange.

15. A gasket as recited in claim 10, wherein said plurality of first tabs are uniformly spaced around said inner peripheral edge and said plurality of second tabs are uniformly spaced around said outer peripheral edge.

16. A gasket as recited in claim 10, wherein at least one of said plurality of first tabs and said plurality of second tabs are placed on each distinguishable side of said sealing body.

17. A gasket as recited in claim 11, wherein said plurality of first tabs are bent downwardly from said sealing body towards said interior wall of the first mating component at an angle greater than 90° from their preformed state.

18. A gasket as recited in claim 11, wherein said plurality of first tabs are bent downwardly from said sealing body towards said interior wall of the first mating component to frictionally engage said interior wall to create a spring biased engagement by the tabs against said interior wall.

19. A method for installing a sealing assembly, comprising:
    placing a sealing body, with an inner peripheral edge and an outer peripheral edge, at least one aperture in said sealing body between said inner and outer peripheral edges, and a plurality of first tabs extending from said inner peripheral edge, on a mating surface of a first mating component, with at least one aperture on said mating surface, to align the apertures;

bending said plurality of first tabs extending from said inner peripheral edge downwardly from said sealing body inwardly towards an interior wall of said first mating component to be generally perpendicular to said sealing body;

removing said sealing body from said mating surface;

bending said plurality of first tabs further inwardly towards an interior wall of said first mating component to frictionally engage said interior wall; and replacing said sealing body on said mating surface by using the plurality of first tabs to assist in orientating and securing said sealing body on said mating surface.

20. A method for installing a sealing assembly as recited in claim 19, wherein the plurality of first are integral with said sealing body.

21. A method for installing a sealing assembly as recited in claim 19, wherein said bending said plurality of first tabs further inwardly towards an interior wall of said first mating component creates a spring biased engagement by the first tabs against said interior wall.

22. A method for installing a sealing assembly as recited in claim 19, wherein at least one of said plurality of first tabs is placed on each distinguishable side of said sealing body.

23. A method for installing a sealing assembly as recited in claim 19, wherein said sealing body has a plurality of second tabs extending from said outer peripheral edge, and securing said sealing body to said mating surface by bending said plurality of second tabs extending from said outer peripheral edge of said sealing body over an outer peripheral edge of said mating surface.

24. A method for installing a sealing assembly as recited in claim 23, wherein the plurality of first and second tabs extend from said sealing body in an orientation opposite each other.

* * * * *